United States Patent
Moazzen

(10) Patent No.: US 12,463,242 B2
(45) Date of Patent: Nov. 4, 2025

(54) ADVANCED CATHODE MATERIALS FOR LONG-LIFE LITHIUM-ION BATTERIES

(71) Applicant: NISSAN NORTH AMERICA, INC., Franklin, TN (US)

(72) Inventor: Elahe Moazzen, Southfield, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 676 days.

(21) Appl. No.: 17/853,885

(22) Filed: Jun. 29, 2022

(65) Prior Publication Data

US 2024/0006652 A1    Jan. 4, 2024

(51) Int. Cl.
| | |
|---|---|
| *H01M 10/0525* | (2010.01) |
| *H01M 4/02* | (2006.01) |
| *H01M 4/485* | (2010.01) |
| *H01M 4/58* | (2010.01) |
| *H01M 4/62* | (2006.01) |

(52) U.S. Cl.
CPC ....... *H01M 10/0525* (2013.01); *H01M 4/485* (2013.01); *H01M 4/5815* (2013.01); *H01M 4/5825* (2013.01); *H01M 4/625* (2013.01); H01M 2004/028 (2013.01); H01M 2300/0065 (2013.01)

(58) Field of Classification Search
None
See application file for complete search history.

(56) References Cited

U.S. PATENT DOCUMENTS

| | | | |
|---|---|---|---|
| 8,785,914 B2 | 7/2014 | Choi et al. | |
| 9,787,221 B2 | 10/2017 | Kim et al. | |
| 9,917,335 B2 | 3/2018 | Jarvis et al. | |
| 10,374,221 B2* | 8/2019 | Yushin | H01M 4/625 |
| 10,541,358 B2 | 1/2020 | Park et al. | |
| 10,741,845 B2* | 8/2020 | Yushin | H01M 4/582 |
| 11,283,003 B2 | 3/2022 | Sadr | |
| 11,581,582 B2* | 2/2023 | Xu | H01M 10/05 |
| 2010/0330421 A1* | 12/2010 | Cui | H01M 4/134 |
| | | | 977/948 |
| 2013/0344391 A1* | 12/2013 | Yushin | H01M 4/583 |
| | | | 429/218.1 |
| 2014/0072875 A1* | 3/2014 | Uchiyama | H01M 4/581 |
| | | | 429/231.1 |
| 2014/0370380 A9* | 12/2014 | Cui | H01M 4/1395 |
| | | | 977/948 |
| 2015/0155546 A1* | 6/2015 | Yushin | H01M 4/136 |
| | | | 427/78 |
| 2016/0351973 A1 | 12/2016 | Albano et al. | |

(Continued)

FOREIGN PATENT DOCUMENTS

| | | | | |
|---|---|---|---|---|
| EP | 2043183 A2 * | 4/2009 | | C01B 25/45 |
| EP | 4553921 A2 * | 5/2025 | | H01M 10/0562 |

(Continued)

*Primary Examiner* — Kevin M Bernatz
(74) *Attorney, Agent, or Firm* — Global IP Counselors, LLP

(57) ABSTRACT

A cathode is provided that includes a catholyte material and cathode active material particles. The cathode active material particles include an electrically conductive core and a cathode active material. The electrically conductive core is formed of an electrically conductive material. The cathode active material is disposed on a surface of the electrically conductive core.

17 Claims, 8 Drawing Sheets

(56) References Cited

U.S. PATENT DOCUMENTS

| | | | |
|---|---|---|---|
| 2017/0117535 A1* | 4/2017 | Yoon | H01M 4/1391 |
| 2019/0115615 A1* | 4/2019 | Kwon | H01M 4/136 |
| 2019/0123384 A1* | 4/2019 | Harry | H01M 4/62 |
| 2020/0091566 A1 | 3/2020 | Jeong et al. | |
| 2020/0243871 A1* | 7/2020 | Choi | H01M 4/382 |
| 2020/0259206 A1* | 8/2020 | Harry | H01M 4/587 |
| 2021/0280873 A1* | 9/2021 | Ku | H01M 4/382 |
| 2021/0288314 A1 | 9/2021 | Liu et al. | |
| 2022/0302457 A1* | 9/2022 | Abdul Jabbar | H01M 4/62 |
| 2023/0058900 A1* | 2/2023 | Jeong | H01M 4/62 |
| 2023/0084565 A1* | 3/2023 | Chung | H01M 4/134 |
| | | | 429/224 |
| 2023/0096033 A1* | 3/2023 | Jang | H01M 10/0525 |
| | | | 429/322 |
| 2023/0145609 A1* | 5/2023 | Brown | H01M 10/0565 |
| | | | 429/306 |
| 2024/0222631 A1* | 7/2024 | Lim | H01M 4/131 |
| 2024/0258502 A1* | 8/2024 | Lee | H01M 4/02 |
| 2024/0400410 A1* | 12/2024 | Liu | C01G 53/50 |

FOREIGN PATENT DOCUMENTS

| | | |
|---|---|---|
| JP | 2019140022 A | 8/2019 |
| WO | 2020165270 A1 | 8/2020 |

\* cited by examiner

ADVANCED CATHODE MATERIALS FOR LONG-LIFE LITHIUM-ION BATTERIES

BACKGROUND

Field of the Invention

The present invention generally relates to a cathode having reduced contact between an electrically conductive additive and a solid electrolyte material for a solid-state-lithium-ion battery, and a lithium-ion battery. The cathode includes cathode active material particles and a catholyte material. The cathode active material particles include an electrically conductive core and a cathode active material disposed on a surface of the electrically conductive core, or the cathode active material particles include a catholyte material core and a cathode active material disposed on a surface of the catholyte material core.

Background Information

Lithium-based batteries that include lithium metal anodes or lithium-based cathode material are desirable because they have a high energy density and, thus, can generate a large amount of power with a relatively thin electrode structure, thus permitting a reduction in the size of the battery as compared with other conventional batteries including anodes made of carbon or silicon. Conventional lithium-based all-solid-state batteries use a lithium metal anode and a cathode formed of solid electrolyte material, complex oxides such as lithium nickel manganese cobalt oxide (LiNiMnCoO$_2$, also commonly referred to as "NMC"), and a carbon additive to improve electron and lithium ion conductivity between the active material particles and the solid electrolyte material.

However, there are several drawbacks with conventional lithium cathodes that include a solid electrolyte material and a carbon additive. For example, there are several voids between the carbon additive and the solid electrolyte material, thereby reducing the conductivity between the active material particles and the solid electrolyte material and also causing polarization and impedance resistance in the cathode. Furthermore, the high surface area of the carbon additive accelerates the decomposition of the solid electrolyte material in the cathode, thereby increasing the impedance and degradation of the cathode. The carbon additive also causes undesirable cracking of the cathode active material particles, resulting in a loss of capacity and an increase in impedance in the cathode.

In order to reduce the decomposition of the solid electrolyte material and decrease the impedance and degradation of the cathode, it has been proposed to use carbon fibers rather than carbon black, since carbon fibers have a smaller surface area and thus cause less side reactions with the solid electrolyte material in the cathode. However, even when carbon fibers are used, there are still undesirable side reactions that cause decomposition of the solid electrolyte material.

Therefore, further improvement is needed to sufficiently reduce the decomposition of the solid electrolyte material in the cathode and suppress the increase in impedance of the cathode in a solid-state battery that includes a solid electrolyte material and cathode active material particles. In particular, it is desirable to reduce the contact between the solid electrolyte material and carbon or other conductive material provided outside the cathode active material particles as much as possible while still providing sufficient electron and lithium ion conductivity between the active material particles and the solid electrolyte material.

SUMMARY

It has been discovered that the contact between the solid electrolyte material and carbon or other conductive material provided outside the cathode active material particles can be reduced either by providing an electrically conductive core formed of an electrically conductive material, such as a carbon material, within the cathode active material particles or by coating solid electrolyte material particles with a cathode active material. By providing an electrically conductive core within the cathode active material particles, the internal impedance and capacity retention can be enhanced, and cracking of the cathode active material can be reduced, by reducing the contact between the solid electrolyte material and the electrically conductive material and thereby decreasing the oxidation of the solid electrolyte material.

In addition, by coating the solid electrolyte material particles with a cathode active material, the amount of carbon outside the solid electrolyte particles becomes irrelevant, since the solid electrolyte particles are coated with the cathode active material and, thus, do not come into direct contact with the carbon outside the solid electrolyte particles.

Therefore, it is desirable to provide a lithium-ion battery, such as a solid state battery, that includes such a cathode in which the cathode active material particles include an electrically conductive core or the solid electrolyte particles are coated with a cathode active material.

In view of the state of the known technology, one aspect of the present disclosure is to provide a cathode having a reduced amount of carbon additive. The cathode includes a catholyte material and cathode active material particles. The cathode active material particles include an electrically conductive core and a cathode active material. The electrically conductive core is formed of an electrically conductive material, and the cathode active material is disposed on a surface of the electrically conductive core.

Another aspect of the present disclosure is to provide a battery including a cathode having a reduced amount of carbon additive. The battery includes a cathode, an anode and an electrolyte disposed between the cathode and the anode. The cathode includes a catholyte material and cathode active material particles. The cathode active material particles include an electrically conductive core and a cathode active material. The electrically conductive core is formed of an electrically conductive material, and the cathode active material is disposed on a surface of the electrically conductive core.

By providing the electrically conductive material as a core within the cathode active material particles, the amount of electrically conductive material outside the cathode active material particles, i.e., electrically conductive additive, can be reduced as compared with conventional solid state batteries. Thus, the degradation due to contact between the electrically conductive additive and the solid electrolyte material in the cathode can be reduced. Thus, the cracking of the cathode active material can be reduced, and the internal impedance and the capacity retention of the cathode can be improved, thereby improving the overall battery performance.

A further aspect of the present disclosure is to provide a battery including a cathode having reduced contact between the solid electrolyte material and a conductive additive. The battery includes a cathode, an anode and an electrolyte disposed between the cathode and the anode. The cathode includes cathode active material particles, and the cathode active material particles include a catholyte material core and a cathode active material disposed on a surface of the catholyte material core.

By coating the solid electrolyte particles with the cathode active material, the amount of electrically conductive material outside the cathode active material particles, i.e., electrically conductive additive, becomes irrelevant such that it does not adversely impact cathode and battery performance as in conventional solid state batteries. In particular, because the cathode active material is coated around the solid electrolyte particles, the solid electrolyte material does not contact the electrically conductive additive that is external to the cathode active material particles. Therefore, the degradation due to contact between the electrically conductive additive and the solid electrolyte material in the cathode can be reduced or eliminated. As a result, the cracking of the cathode active material can be reduced and the internal impedance and capacity retention of the cathode can be improved, thereby improving the overall battery performance.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
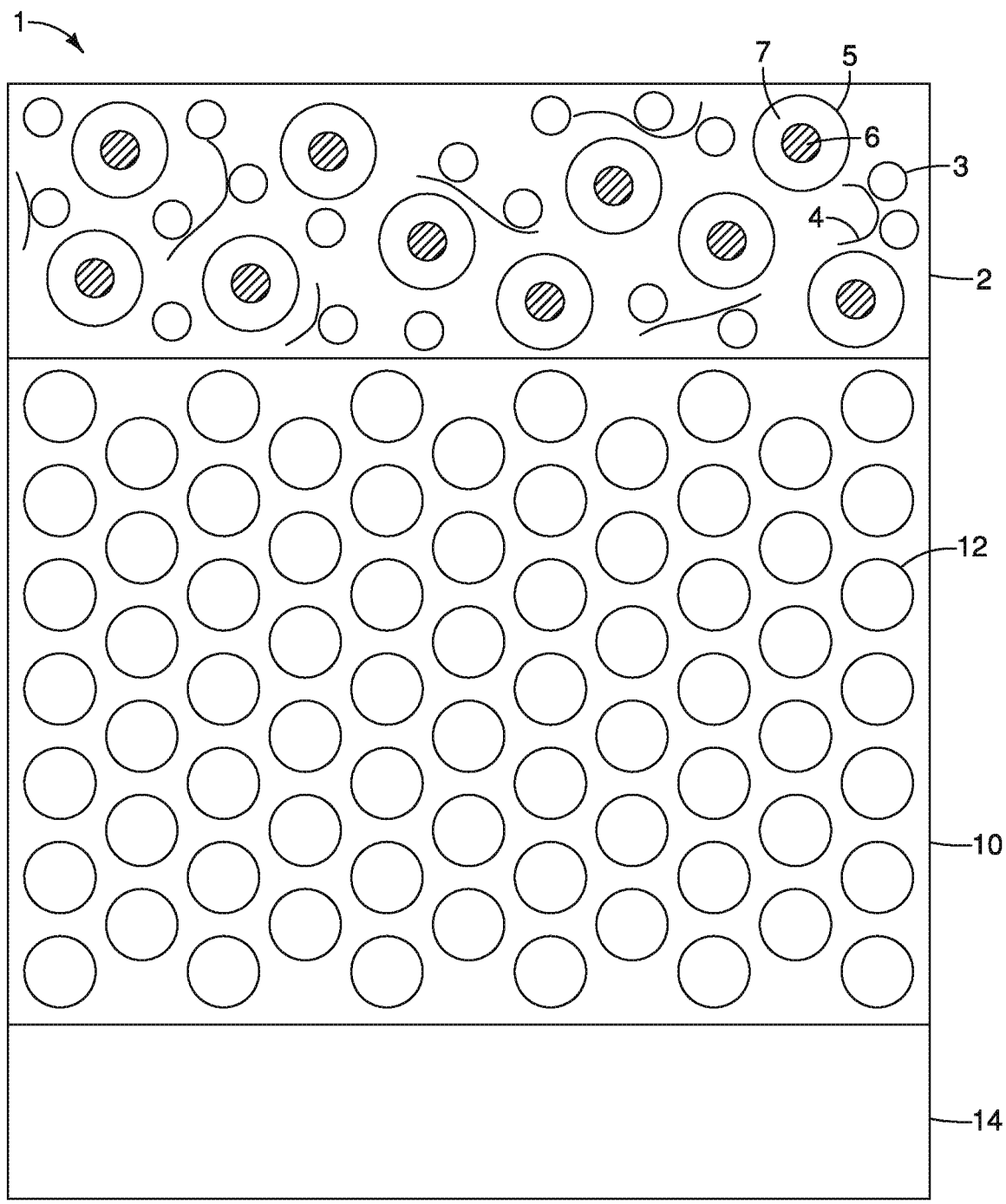
FIG. 1 is a cross sectional view of a solid state battery according to one embodiment.

Referring initially to FIG. 1, a solid-state battery 1 is illustrated that includes a cathode 2 in accordance with a first embodiment. The solid-state battery 1 can be incorporated in a vehicle, a mobile device, a laptop computer or other suitable personal electronic device. The solid-state battery 1 is preferably an all-solid-state battery.

As shown in FIG. 1, the cathode 2 includes catholyte particles 3, an electrically conductive additive 4, and cathode active material particles 5. The cathode 2 may also optionally contain a binder (not shown). The binder may be any suitable electrode binder material. For example, the binder may include polytetrafluoroethylene, polyvinylidene fluoride, styrene-butadiene rubber, a cellulose material or any combination thereof. The binder is preferably polytetrafluoroethylene. The cathode 2 has a thickness of approximately 10 μm to 150 μm.

The catholyte particles 3 are formed of any suitable catholyte material for a solid-state battery. For example, the catholyte material may be any suitable lithium-ion conductive solid electrolyte material. For example, the solid electrolyte material can be a sulfide-based solid electrolyte, such as $Li_6PS_5Cl$, an oxide solid electrolyte, or a hybrid solid electrolyte that includes a sulfide-based solid electrolyte and a polyethylene oxide ("PEO") based polymer. The catholyte particles 3 have a size of approximately 100 nm to 5 μm.

The electrically conductive additive 4 can be any suitable electrically conductive additive. For example, the electrically conductive additive 4 can be a carbon material. The electrically conductive additive 4 is preferably a carbon black material or a carbon nanofiber having a surface area of approximately 5 $m^2/g$ to 100 $m^2/g$.

The cathode active material particles 5 each include an electrically conductive core 6 covered by a cathode active material 7. The cathode active material particles 5 have a diameter of approximately 3 μm to 15 μm.

The electrically conductive core 6 is formed of any suitable electrically conductive material. For example, the electrically conductive core 6 can be formed of a carbon material or a conductive polymer, for example, a polymer that includes aromatic cycles, such as a polyfluorene or a polyphenylene, a polymer that includes double bonds such as a poly(acetylene), or a combination of both, such as poly(p-phenylene vinylene) ("PPV"). The electrically conductive core 6 is preferably formed of a conductive carbon material, such as graphite, carbon black, graphene, carbon nanofibers (or micro fibers), bucky ball, graphene with holes, carbon nanotubes (single and multi-wall), and spongy carbon.

In FIG. 1, the electrically conductive core 6 has a spherical shape for each of the cathode active material particles 5. However, it should be understood that the electrically conductive core 6 may have any suitable shape. For example, the electrically conductive core 6 can have a shape of a sphere, a three-dimensional star, a cylinder, a shape having three-dimensional needle projections, a fiber shape, a sponge, a hexagonal prism, a hexagonal prismatic honeycomb sphere, or an irregular shape. As shown in FIG. 1, each of the cathode active material particles 5 has an electrically conductive core 6 with a same shape. However, it should be understood that the cathode active material particles 5 may have different shapes for the electrically conductive core 6. The electrically conductive core 6 has a size of approximately 100 nm to 6 μm.

The cathode active material 7 is provided on the surface of the electrically conductive core 6. As shown in FIG. 1, the cathode active material 7 completely coats or surrounds the electrically conductive core 6 of the cathode active material particles 5. However, it should be understood that the cathode active material 7 may not completely cover the electrically conductive core 6.

The cathode active material 7 is any suitable cathode active material that is compatible with a solid electrolyte. For example, the cathode active material 7 may be a lithium transition metal oxide, a lithium olivine-type material, a sulfur material, or a mixture thereof. The lithium transition metal oxide can be NMC, lithium nickel cobalt aluminum oxide, lithium manganese oxide, lithium nickel manganese oxide, lithium nickel oxide, lithium cobalt oxide, or lithium nickel cobalt oxide. The lithium olivine-type material can be lithium phosphate, lithium iron phosphate, or a mixture thereof. The sulfur material has an extremely low electronic conductivity and can be sulfur, $Li_2S$, or a mixture thereof.

The cathode 2 includes at least 80 percent by weight of the cathode active material particles 5. The cathode 2 also includes at least fifteen percent by weight of the catholyte particles 3. The cathode 2 may include up to three percent by weight of the binder.

The electrically conductive core 6 of the cathode active material particles 5 can constitute as much as ten percent by weight of the cathode 2. However, the cathode 2 includes less than or equal to one percent by weight of the electrically conductive additive 4. Because the cathode active material particles 5 include an electrically conductive core 6, less electrically conductive additive 4 needs to be provided in the cathode 2 as compared with conventional solid-state batteries. Furthermore, because the cathode includes less than one percent by weight of the electrically conductive additive 4, the contact between the catholyte particles 3 and the electrically conductive additive 4 can be reduced as compared with conventional solid-state batteries, thereby decreasing the oxidation of the catholyte particles 3. As such, the internal impedance and capacity retention of the cathode 2 can be enhanced, and cracking of the cathode active material particles 5 can beneficially be reduced.

As shown in FIG. 1, the solid-state battery 1 also includes an electrolyte 10. The electrolyte 10 is formed of solid electrolyte particles 12. The solid electrolyte particles 12 are formed of any suitable lithium-ion conductive solid electrolyte for a solid-state battery. For example, the lithium-ion conductive solid electrolyte can be a sulfide-based solid electrolyte, such as $Li_6PS_5Cl$, an oxide solid electrolyte, or a hybrid solid electrolyte that includes a sulfide-based solid electrolyte and PEO based polymer. For example, the solid electrolyte particles 12 are formed of the same material as the catholyte particles 3, but the catholyte particles 3 preferably have a smaller particle size than the solid electrolyte particles 12. The electrolyte 10 has a thickness of approximately 20 µm to 600 µm.

The solid-state battery 1 further includes an anode 14. The anode 14 is formed of an anode active material. The anode 14 may also optionally include a binder and an additive. The anode active material is any suitable anode active material that is compatible with a solid electrolyte. For example, the anode active material is formed of metal, preferably entirely of metal. For example, the anode active material may be lithium or a lithium alloy. The anode active material may also include a silicon-based anode active material. The anode 14 includes approximately 90-95 percent by weight of the anode active material and five to ten percent by weight of any additive plus any binder. The anode 14 has a thickness of approximately 10 nm to 3 µm.

When a sulfide-based solid electrolyte is used as the electrolyte 10 and the anode 14 includes lithium metal, a protective layer (not shown) may be also provided between the electrolyte 10 and the anode 14.

Figure 2:
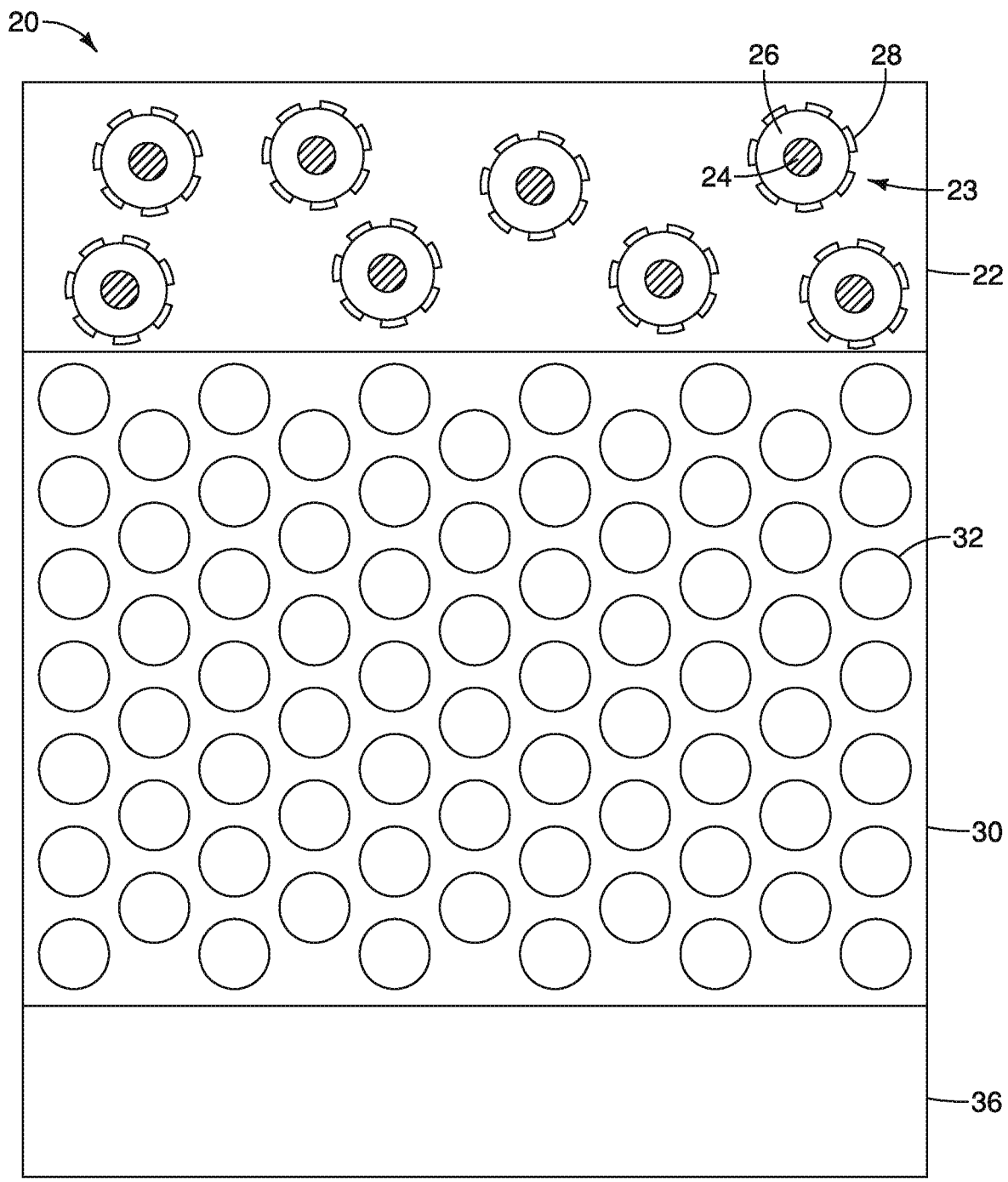
FIG. 2 is a cross sectional view of a solid state battery according to an embodiment.

FIG. 2 shows a solid-state battery 20 including a cathode 22 in accordance with a second embodiment. Like the solid-state battery 1 of the first embodiment, the solid-state battery 20 is preferably an all-solid-state battery and can be incorporated in a vehicle, a mobile device, a laptop computer or other suitable personal electronic devices.

As shown in FIG. 2, the cathode 22 includes cathode active material particles 23. The cathode 22 may also optionally contain a binder (not shown). The binder may be any suitable electrode binder material. For example, the binder may include polytetrafluoroethylene, polyvinylidene fluoride, styrene-butadiene rubber, a cellulose material or any combination thereof. The binder is preferably polytetrafluoroethylene. The cathode 22 has a thickness of approximately 10 µm to 150 µm.

The cathode active material particles 23 include an electrically conductive core 24, a cathode active material 26, and a catholyte material 28. The electrically conductive core 24 is formed of any suitable electrically conductive material. For example, the electrically conductive core 24 can be formed of a carbon material or a conductive polymer, for example, a polymer that includes aromatic cycles, such as a polyfluorene or a polyphenylene, a polymer that includes double bonds such as a poly(acetylene), or a combination of both, such as PPV. The electrically conductive core 24 is preferably formed of a carbon material, such as graphene, carbon nanofibers (or micro fibers), bucky ball, graphene with holes, carbon nanotubes (single and multi-wall), and spongy carbon. The cathode active material particles 23 have a diameter of approximately 3 µm to 15 µm.

In FIG. 2, the electrically conductive core 24 has a spherical shape for each of the cathode active material particles 23. However, it should be understood that the electrically conductive core 24 may have any suitable shape. For example, the electrically conductive core 24 can have a shape of a sphere, a three-dimensional star, a cylinder, a shape having three-dimensional needle projections, a fiber shape, a sponge, a hexagonal prism, a hexagonal prismatic honeycomb sphere, or an irregular shape. As shown in FIG. 2, each of the cathode active material particles 23 has an electrically conductive core 24 with a same shape. However, it should be understood that the cathode active material particles 23 may have different shapes for the electrically conductive core 24. The electrically conductive core 24 has a size of approximately 100 nm to 6 µm.

The cathode active material 26 is provided on the surface of the electrically conductive core 24. As shown in FIG. 2, the cathode active material 26 completely coats or surrounds the electrically conductive core 24 of the cathode active material particles 23. However, it should be understood that the cathode active material 26 may not completely cover the electrically conductive core 24.

The cathode active material 26 is any suitable cathode active material that is compatible with a solid electrolyte. For example, the cathode active material 26 may be a lithium transition metal oxide, a lithium olivine-type material, a sulfur material, or a mixture thereof. The lithium transition metal oxide can be NMC, lithium nickel cobalt aluminum oxide, lithium manganese oxide, lithium nickel manganese oxide, lithium nickel oxide, lithium cobalt oxide, or lithium nickel cobalt oxide. The lithium olivine-type material can be lithium phosphate, lithium iron phosphate, or a mixture thereof. The sulfur material has an extremely low electronic conductivity and can be sulfur, $Li_2S$, or a mixture thereof.

The cathode active material particles 23 also include a catholyte material 28 provided on the cathode active material 26. As shown in FIG. 2, the catholyte material 28 does not completely cover the cathode active material 26 but rather is provided in a pattern spaced apart on the surface of the cathode active material 26. However, it should be understood that the catholyte material 28 may be provided on the surface of the cathode active material 26 in any suitable pattern, regular or irregular. Furthermore, the catholyte material 28 should not completely cover the surface of the cathode active material 26 if the catholyte material 28 is insulating.

The catholyte material 28 can be any suitable catholyte material for a solid-state battery. For example, the catholyte material 28 may be any suitable lithium-ion conductive solid electrolyte material. For example, the solid electrolyte material can be a sulfide-based solid electrolyte, such as $Li_6PS_5Cl$, an oxide solid electrolyte, or a hybrid solid electrolyte that includes a sulfide-based solid electrolyte and a PEO based polymer.

The cathode 22 includes at least 95 percent by weight of the cathode active material particles 23. The cathode 22 may optionally include up to three percent by weight of the binder. The electrically conductive core 24 of the cathode active material particles 23 can constitute as much as ten percent by weight of the cathode 22. However, the cathode 22 does not include any electrically conductive additive provided external to the cathode active material particles 23. As such, the internal impedance and capacity retention of the cathode 22 can be enhanced, and cracking of the cathode active material particles 23 can beneficially be reduced.

As shown in FIG. 2, the solid-state battery 20 also includes an electrolyte 30. The electrolyte 30 is formed of solid electrolyte particles 32. As in the first embodiment, the solid electrolyte particles 32 are formed of any suitable lithium-ion conductive solid electrolyte for a solid-state battery. For example, the solid electrolyte can be a sulfide-based solid electrolyte, such as $Li_6PS_5Cl$, an oxide solid electrolyte, or a hybrid solid electrolyte that includes a sulfide-based solid electrolyte and a PEO based polymer. For example, the solid electrolyte particles 32 are formed of the same material as the catholyte material 28. The electrolyte 30 has a thickness of approximately 20 μm to 600 μm.

The solid-state battery 20 further includes an anode 36 as shown in FIG. 2. The anode 36 is formed of an anode active material. The anode 36 may also optionally include a binder and an additive. The anode active material is any suitable anode active material that is compatible with a solid electrolyte. For example, the anode active material is formed of metal, preferably entirely of metal. The anode active material is preferably formed of lithium, sodium, magnesium, or a mixture thereof. For example, the anode active material may be lithium or a lithium alloy. The anode active material may also be a silicon-based anode active material. The anode 36 includes approximately 90-95 percent by weight of the anode active material and five to ten percent by weight of any additive plus any binder. The anode 36 has a thickness of approximately 10 nm to 3 μm.

When a sulfide-based solid electrolyte is used as the electrolyte 30 and the anode 36 includes lithium metal, a protective layer (not shown) may also be optionally provided between the electrolyte 30 and the anode 36.

Figure 3:
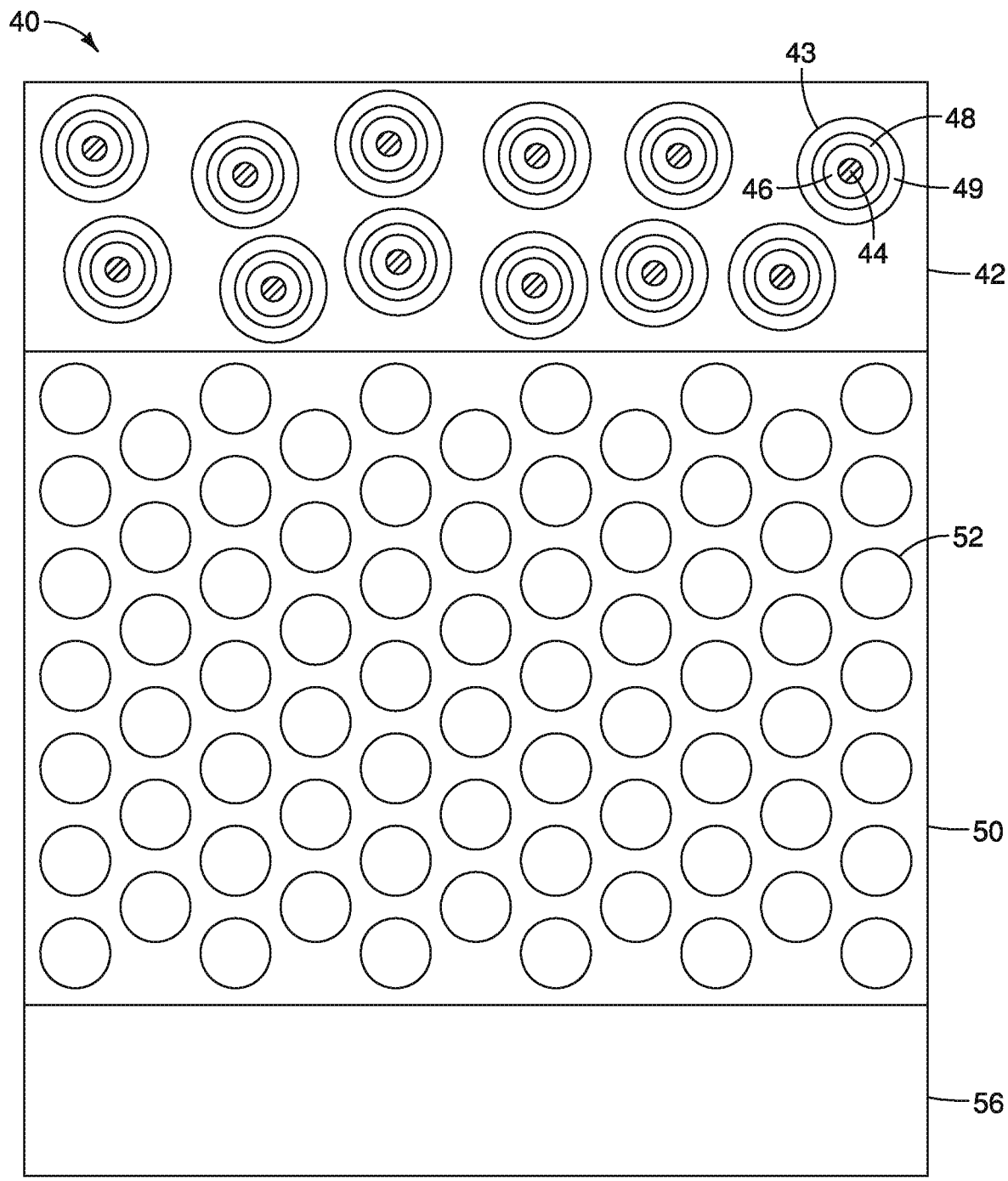
FIG. 3 is a cross sectional view of a solid state battery according to one embodiment.

FIG. 3 shows a solid-state battery 40 that includes a cathode 42 in accordance with a third embodiment. Like the solid-state battery of the first and second embodiments, the solid-state battery 40 is preferably an all-solid-state battery and can be incorporated in a vehicle, a mobile device, a laptop computer or other suitable personal electronic devices.

As shown in FIG. 3, the cathode 42 includes cathode active material particles 43. The cathode 42 may also optionally contain a binder (not shown). The binder may be any suitable electrode binder material. For example, the binder may include polytetrafluoroethylene, polyvinylidene fluoride, styrene-butadiene rubber, a cellulose material or any combination thereof. The binder is preferably polytetrafluoroethylene. The cathode 42 has a thickness of approximately 10 μm to 150 μm.

The cathode active material particles 43 include an electrically conductive core 44, a first cathode active material layer 46, a catholyte material 48, and a second cathode active material layer 49. The electrically conductive core 44 is formed of any suitable electrically conductive material. For example, the electrically conductive core 44 can be formed of a carbon material or a conductive polymer, for example, a polymer that includes aromatic cycles, such as a polyfluorene or a polyphenylene, a polymer that includes double bonds such as a poly(acetylene), or a combination of both, such as PPV. The electrically conductive core 44 is preferably formed of a carbon material, such as graphene, carbon nanofibers (or micro fibers), bucky ball, graphene with holes, carbon nanotubes (single and multi-wall), and spongy carbon. The cathode active material particles 43 have a diameter of approximately 3 μm to 15 μm.

As shown in FIG. 3, the electrically conductive core 44 has a spherical shape for each of the cathode active material particles 43. However, it should be understood that the electrically conductive core 44 may have any suitable shape. For example, the electrically conductive core 44 can have a shape of a sphere, a three-dimensional star, a cylinder, a shape having three-dimensional needle projections, a fiber shape, a sponge, a hexagonal prism, a hexagonal prismatic honeycomb sphere, or an irregular shape. As shown in FIG. 3, each of the cathode active material particles 43 has an electrically conductive core 44 with a same shape. However, it should be understood that the cathode active material particles 43 may have different shapes for the electrically conductive core 44. The electrically conductive core 44 has a size of approximately 100 nm to 6 μm.

The first cathode active material layer 46 is provided on the surface of the electrically conductive core 44. As shown in FIG. 3, the first cathode active material layer 46 completely coats or surrounds the electrically conductive core 44 of the cathode active material particles 43 so as to avoid contact between the electrically conductive core 44 and the catholyte 48.

The first cathode active material layer 46 is formed of any suitable cathode active material that is compatible with a solid electrolyte. For example, the cathode active material of the first cathode active material layer 46 may be a lithium transition metal oxide, a lithium olivine-type material, a sulfur material, or a mixture thereof. The lithium transition metal oxide can be NMC, lithium nickel cobalt aluminum oxide, lithium manganese oxide, lithium nickel manganese oxide, lithium nickel oxide, lithium cobalt oxide, or lithium nickel cobalt oxide. The lithium olivine-type material can be lithium phosphate, lithium iron phosphate, or a mixture thereof. The sulfur material has an extremely low electronic conductivity and can be sulfur, $Li_2S$, or a mixture thereof.

The cathode active material particles 43 also include a catholyte material 48 provided on the first cathode active material layer 46. As shown in FIG. 3, the catholyte material 48 completely covers or surrounds the first cathode active material layer 46. However, it should be understood that the catholyte material 48 may not completely cover or surround the first cathode active material layer 46 and instead may be provided on the surface of the first cathode active material layer 46 in any suitable pattern, regular or irregular.

The catholyte material 48 can be any suitable catholyte material for a solid-state battery. For example, the catholyte material 48 may be any suitable lithium-ion conductive solid electrolyte material. For example, the solid electrolyte material can be a sulfide-based solid electrolyte, such as $Li_6PS_5Cl$, an oxide solid electrolyte, or a hybrid solid electrolyte that includes a sulfide-based solid electrolyte and a PEO based polymer.

As shown in FIG. 3, the cathode active material particles 43 further include a second cathode active material layer 49 formed on the catholyte material 48. The second cathode active material layer 49 completely coats or surrounds the catholyte material 48 of the cathode active material particles 43. However, it should be understood that the first cathode active material layer 49 may not completely cover the catholyte material 48.

As with the first cathode active material layer 46, the second cathode active material layer 49 is formed of any suitable cathode active material that is compatible with a solid electrolyte. For example, the cathode active material of the second cathode active material layer 49 can be a lithium transition metal oxide, a lithium olivine-type material, a sulfur material, or a mixture thereof. The lithium transition metal oxide can be NMC, lithium nickel cobalt aluminum oxide, lithium manganese oxide, lithium nickel manganese oxide, lithium nickel oxide, lithium cobalt oxide, or lithium nickel cobalt oxide. The lithium olivine-type material can be lithium phosphate, lithium iron phosphate, or a mixture thereof. The sulfur material has an extremely low electronic conductivity and can be sulfur, $Li_2S$, or a mixture thereof. The cathode active material of the second cathode active material layer 49 is preferably the same material as the cathode active material of the first cathode active material layer 46.

The cathode 42 includes at least 95 percent by weight of the cathode active material particles 43. The cathode 42 may optionally include up to three percent by weight of the binder. The electrically conductive core 44 of the cathode active material particles 43 can constitute as much as ten percent by weight of the cathode 42. In this embodiment, the cathode 42 does not include any electrically conductive additive provided external to the cathode active material particles 43. However, it should be understood that an electrically conductive additive may be provided external to the cathode active material particles 43, as long as the amount of the electrically conductive additive is less than or equal to one percent by weight relative to a total weight of the cathode 42. As such, the internal impedance and capacity retention of the cathode 42 can be enhanced, and cracking of the cathode active material particles 43 can beneficially be reduced.

As shown in FIG. 3, the solid-state battery 40 also includes an electrolyte 50. The electrolyte 50 is formed of solid electrolyte particles 52. As in the first and second embodiments, the solid electrolyte particles 52 are formed of any suitable lithium-ion conductive solid electrolyte for a solid-state battery. For example, the solid electrolyte can be a sulfide-based solid electrolyte, such as $Li_6PS_5Cl$, an oxide solid electrolyte, or a hybrid solid electrolyte that includes a sulfide-based solid electrolyte and a PEO based polymer. For example, the solid electrolyte particles 52 are formed of the same material as the catholyte material 48. The electrolyte 50 has a thickness of approximately 20 μm to 600 μm.

The solid-state battery 40 further includes an anode 56 as shown in FIG. 3. The anode 56 is formed of an anode active material. The anode 56 may also optionally include a binder and an additive. The anode active material is any suitable anode active material that is compatible with a solid electrolyte. For example, the anode active material is formed of metal, preferably entirely of metal. The anode active material is preferably formed of lithium, sodium, magnesium, or a mixture thereof. For example, the anode active material may be lithium or a lithium alloy. The anode active material may also be a silicon-based anode active material. The anode 56 includes approximately 90-95 percent by weight of the anode active material and five to ten percent by weight of any additive plus any binder. The anode 56 has a thickness of approximately 10 nm to 3 μm.

When a sulfide-based solid electrolyte is used as the electrolyte 50 and the anode 56 includes lithium metal, a protective layer (not shown) may also be optionally provided between the electrolyte 50 and the anode 56.

Figure 4:
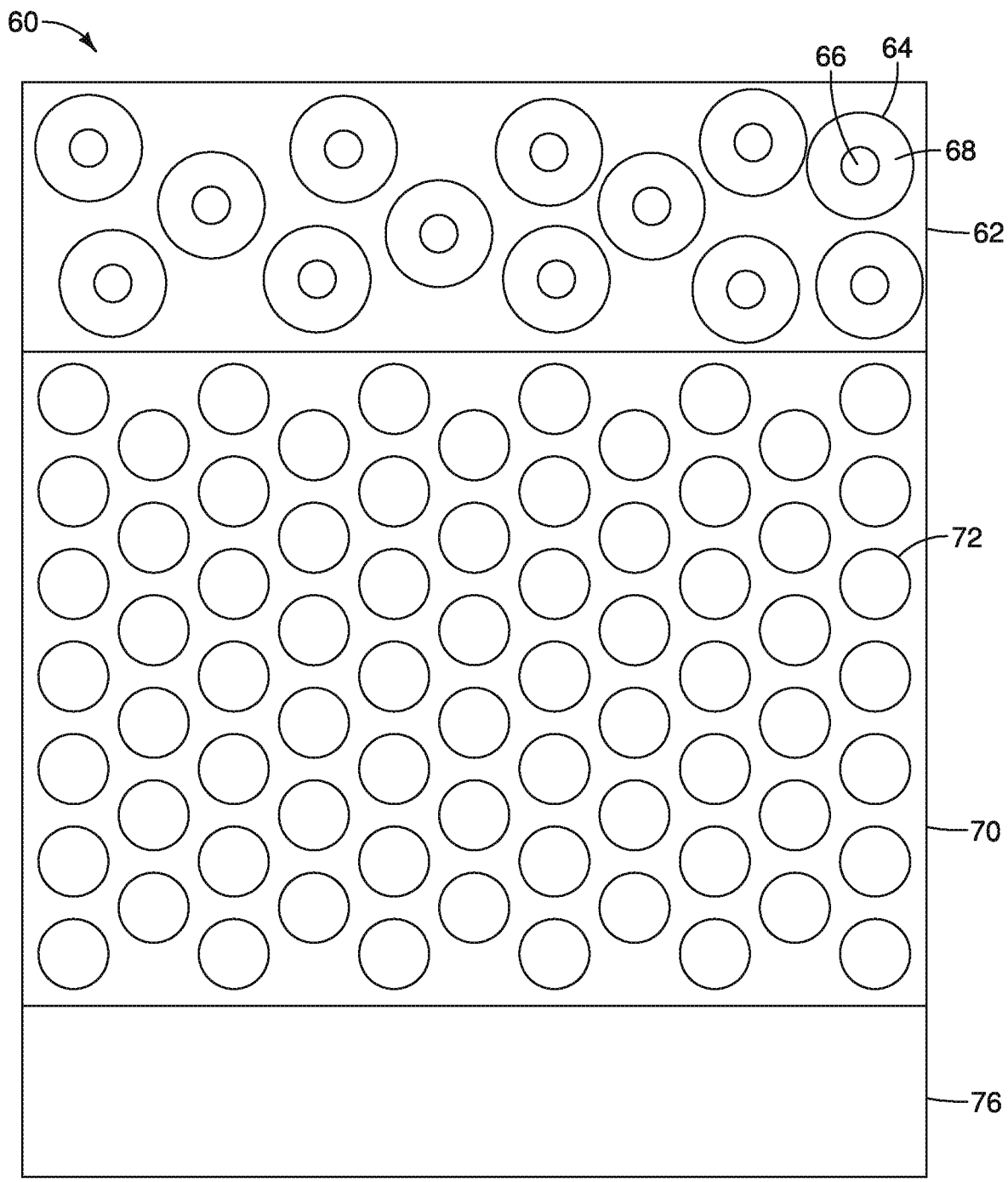
FIG. 4 is a cross sectional view of a solid state battery according to an embodiment.

FIG. 4 shows a solid-state battery 60 including a cathode 62 in accordance with a fourth embodiment. Like the solid-state battery of the first, second and third embodiments, the solid-state battery 60 is preferably an all-solid-state battery and can be incorporated in a vehicle, a mobile device, a laptop computer or other suitable personal electronic devices.

As shown in FIG. 4, the cathode 62 includes cathode active material particles 64. The cathode 62 may also optionally contain a binder and an electrically conductive additive (not shown). The binder may be any suitable electrode binder material. For example, the binder may include polytetrafluoroethylene, polyvinylidene fluoride, styrene-butadiene rubber, a cellulose material or any combination thereof. The binder is preferably polytetrafluoroethylene. The cathode 62 has a thickness of approximately 10 μm to 150 μm.

The electrically conductive additive is provided external to the cathode active material particles 64 and can be any suitable electrically conductive additive. For example, the electrically conductive additive can be a carbon material. The electrically conductive additive is preferably a carbon black material or a carbon nanofiber having a surface area of approximately 5 $m^2$/g to 100 $m^2$/g.

Unlike in the first, second and third embodiments, the amount of electrically conductive additive in this embodiment can be any suitable conventional amount. For example, the cathode 62 can include up to ten percent by weight of an electrically conductive additive relative to a total weight of the cathode 62. The amount of electrically conductive additive in this embodiment is irrelevant, since the catholyte material is coated with a cathode active material and, thus, does not come into direct contact with the electrically conductive additive outside the cathode active material particles 64.

The cathode active material particles 64 include a catholyte material core 66 and a cathode active material 68. As shown in FIG. 4, the cathode active material 68 completely covers or surrounds the catholyte material core 66. However, it should be understood that the cathode active material 68 may not completely cover or surround the catholyte material core 66 and instead may be provided on the surface of the catholyte material core 66 in any suitable pattern, regular or irregular. The cathode active material particles 64 have a diameter of approximately 3 μm to 15 μm.

The catholyte material core 66 can be formed of any suitable catholyte material for a solid-state battery. For example, the catholyte material core 66 can be formed any suitable lithium-ion conductive solid electrolyte material. For example, the solid electrolyte material can be a sulfide-based solid electrolyte, such as $Li_6PS_5Cl$, an oxide solid electrolyte, or a hybrid solid electrolyte that includes a sulfide-based solid electrolyte and a PEO based polymer.

As shown in FIG. 4, the catholyte material core 66 has a spherical shape for each of the cathode active material particles 64. However, it should be understood that the catholyte material core 66 may have any suitable shape. As shown in FIG. 4, each of the cathode active material particles 64 has a catholyte material core 66 with a same shape. However, it should be understood that the cathode active material particles 64 may have different shapes for the catholyte material core 66. The catholyte material core 66 has a size of approximately 100 nm to 6 μm.

The cathode active material 68 is provided on the surface of the catholyte material core 66. As shown in FIG. 4, the cathode active material 68 completely coats or surrounds the catholyte material core 66 of the cathode active material particles 64. However, it should be understood that the cathode active material 68 may not completely cover the catholyte material core 66.

The cathode active material 68 is formed of any suitable cathode active material that is compatible with a solid electrolyte. For example, the cathode active material 68 may be a lithium transition metal oxide, a lithium olivine-type material, a sulfur material, or a mixture thereof. The lithium transition metal oxide can be NMC, lithium nickel cobalt aluminum oxide, lithium manganese oxide, lithium nickel manganese oxide, lithium nickel oxide, lithium cobalt oxide, or lithium nickel cobalt oxide. The lithium olivine-type material can be lithium phosphate, lithium iron phosphate, or a mixture thereof. The sulfur material has an extremely low electronic conductivity and can be sulfur, $Li_2S$, or a mixture thereof.

The cathode 62 includes at least 80 percent by weight of the cathode active material particles 64. The cathode 62 may optionally include up to three percent by weight of the binder and up to 10 percent by weight of an electrically conductive additive.

As shown in FIG. 4, the solid-state battery 60 also includes an electrolyte 70. The electrolyte 70 is formed of solid electrolyte particles 72. As in the first, second and third embodiments, the solid electrolyte particles 72 are formed of any suitable lithium-ion conductive solid electrolyte for a solid-state battery. For example, the solid electrolyte can be a sulfide-based solid electrolyte, such as $Li_6PS_5Cl$, an oxide solid electrolyte, or a hybrid solid electrolyte that includes a sulfide-based solid electrolyte and a PEO based polymer. For example, the solid electrolyte particles 72 are formed of the same material as the catholyte material 48. The electrolyte 70 has a thickness of approximately 20 μm to 600 μm.

The solid-state battery 60 further includes an anode 76 as shown in FIG. 4. The anode 76 is formed of an anode active material. The anode 76 may also optionally include a binder and an additive. The anode active material is any suitable anode active material that is compatible with a solid electrolyte. For example, the anode active material is formed of metal, preferably entirely of metal. The anode active material is preferably formed of lithium, sodium, magnesium, or a mixture thereof. For example, the anode active material may be lithium or a lithium alloy. The anode active material may also be a silicon-based anode active material. The anode 76 includes approximately 90-95 percent by weight of the anode active material and five to ten percent by weight of any additive plus any binder. The anode 76 has a thickness of approximately 10 nm to 3 μm.

When a sulfide-based solid electrolyte is used as the electrolyte 70 and the anode 76 includes lithium metal, a protective layer (not shown) may also be optionally provided between the electrolyte 70 and the anode 76.

Figure 5:
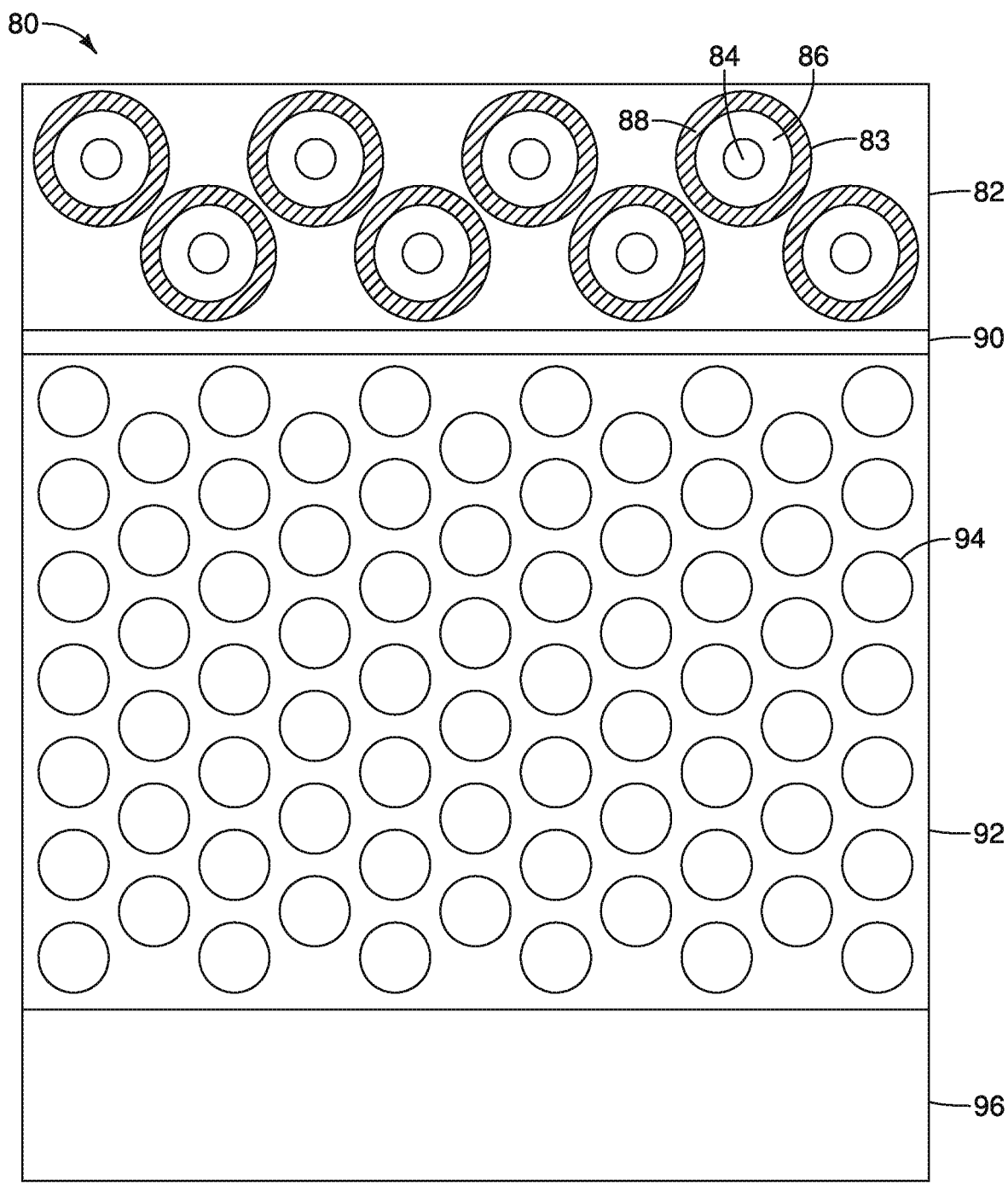
FIG. 5 is a cross sectional view of a solid state battery according to one embodiment.

FIG. 5 shows a solid-state battery 80 that includes a cathode 82 in accordance with a fifth embodiment. Like the solid-state battery of the first, second, third and fourth embodiments, the solid-state battery 80 is preferably an all-solid-state battery and can be incorporated in a vehicle, a mobile device, a laptop computer or other suitable personal electronic devices.

As shown in FIG. 5, the cathode 82 includes cathode active material particles 83. The cathode 82 may also optionally contain a binder (not shown). The binder may be any suitable electrode binder material. For example, the binder may include polytetrafluoroethylene, polyvinylidene fluoride, styrene-butadiene rubber, a cellulose material or any combination thereof. The binder is preferably polytetrafluoroethylene. The cathode 82 has a thickness of approximately 10 μm to 150 μm.

The cathode active material particles 83 include a catholyte material core 84, a cathode active material 86, and an electrically conductive material 88. The catholyte material core 84 can be formed of any suitable catholyte material for a solid-state battery. For example, the catholyte material core 84 can be formed any suitable lithium-ion conductive solid electrolyte material. For example, the lithium-ion conductive solid electrolyte material can be a sulfide-based solid electrolyte, such as $Li_6PS_5Cl$, an oxide solid electrolyte, or a hybrid solid electrolyte that includes a sulfide-based solid electrolyte and a PEO based polymer.

As shown in FIG. 5, the catholyte material core 84 has a spherical shape for each of the cathode active material particles 83. However, it should be understood that the catholyte material core 84 may have any suitable shape. As shown in FIG. 5, each of the cathode active material particles 83 has a catholyte material core 84 with a same shape. However, it should be understood that the cathode active material particles 83 may have different shapes for the catholyte material core 84. The catholyte material core 84 has a size of approximately 100 nm to 6 μm.

The cathode active material 86 is provided on the surface of the catholyte material core 84. As shown in FIG. 5, the cathode active material 86 completely coats or surrounds the catholyte material core 84 of the cathode active material particles 83.

The cathode active material 86 is formed of any suitable cathode active material that is compatible with a solid electrolyte. For example, the cathode active material 86 may be a lithium transition metal oxide, a lithium olivine-type material, a sulfur material, or a mixture thereof. The lithium transition metal oxide can be NMC, lithium nickel cobalt aluminum oxide, lithium manganese oxide, lithium nickel manganese oxide, lithium nickel oxide, lithium cobalt oxide, or lithium nickel cobalt oxide. The lithium olivine-type material can be lithium phosphate, lithium iron phosphate, or a mixture thereof. The sulfur material has an extremely low electronic conductivity and can be sulfur, $Li_2S$, or a mixture thereof.

The electrically conductive material 88 is provided on the surface of the catholyte material core 84. As shown in FIG. 5, the electrically conductive material 88 completely coats or surrounds the cathode active material 86 of the cathode active material particles 83. The electrically conductive material can be any suitable electrically conductive material. For example, the electrically conductive material 88 can be a carbon material or a conductive polymer, for example, a polymer that includes aromatic cycles, such as a polyfluorene or a polyphenylene, a polymer that includes double bonds such as a poly(acetylene), or a combination of both, such as PPV. The electrically conductive material 88 is preferably a carbon material, such as graphene, carbon nanofibers (or micro fibers), bucky ball, graphene with holes, carbon nanotubes (single and multi-wall), and spongy carbon. The cathode active material particles 83 have a diameter of approximately 3 μm to 15 μm.

The cathode 82 includes at least 80 percent by weight of the cathode active material particles 83. The cathode 82 may optionally include up to three percent by weight of the binder. The electrically conductive material 88 can constitute as much as 10 percent by weight of the cathode 82. In this embodiment, the cathode 82 does not include any electrically conductive additive provided external to the cathode active material particles 83, since the outermost surface of the cathode active material particles 83 is an electrically conductive material. However, it should be understood that an electrically conductive additive may be provided external to the cathode active material particles 83, as long as the amount of the electrically conductive additive is less than or equal to one percent by weight relative to a total weight of the cathode 82. As such, the internal impedance and capacity retention of the cathode 82 can be enhanced, and cracking of the cathode active material particles 83 can beneficially be reduced.

As shown in FIG. 5, the solid-state battery 80 also includes a separator 90 that separates the cathode 82 from an electrolyte 92. The separator 90 is formed of any suitable material. For example, the separator 90 can be formed of a material that is electronically isolating, i.e., blocks electrons, but is ionically conductive, i.e., permeable to lithium ions. Furthermore, the separator 90 is formed of a material that does not decompose when it comes into contact with carbon in a working potential range. For example, the separator 90 can be formed of a polymer solid state electrolyte, such as a material containing a cross linker, a heat or electrochemical initiator, and an ionic conductor such as polyethylene glycol. The separator 90 has a thickness of 5 nm to 1 μm.

The solid-state battery 80 further includes an electrolyte 92 as shown in FIG. 5. The electrolyte 92 is formed of solid electrolyte particles 94. As in the first, second, third and fourth embodiments, the solid electrolyte particles 94 are formed of any suitable lithium-ion conductive solid electrolyte for a solid-state battery. For example, the solid electrolyte can be a sulfide-based solid electrolyte, such as $Li_6PS_5Cl$, an oxide solid electrolyte, or a hybrid solid electrolyte that includes a sulfide-based solid electrolyte and a PEO based polymer. For example, the solid electrolyte particles 94 are formed of the same material as the catholyte material core 84. The electrolyte 92 has a thickness of approximately 20 μm to 600 μm.

The solid-state battery 80 also includes an anode 96 as shown in FIG. 5. The anode 96 is formed of an anode active material. The anode 96 may also optionally include a binder and an additive. The anode active material is any suitable anode active material that is compatible with a solid electrolyte. For example, the anode active material is formed of metal, preferably entirely of metal. The anode active material is preferably formed of lithium, sodium, magnesium, or a mixture thereof. For example, the anode active material may be lithium or a lithium alloy. The anode active material may also be a silicon-based anode active material. The anode 96 includes approximately 90-95 percent by weight of the anode active material and five to ten percent by weight of any additive plus any binder. The anode 96 has a thickness of approximately 10 nm to 3 μm.

When a sulfide-based solid electrolyte is used as the electrolyte 92 and the anode 96 includes lithium metal, a protective layer (not shown) may also be optionally provided between the electrolyte 92 and the anode 96.

Figure 6:
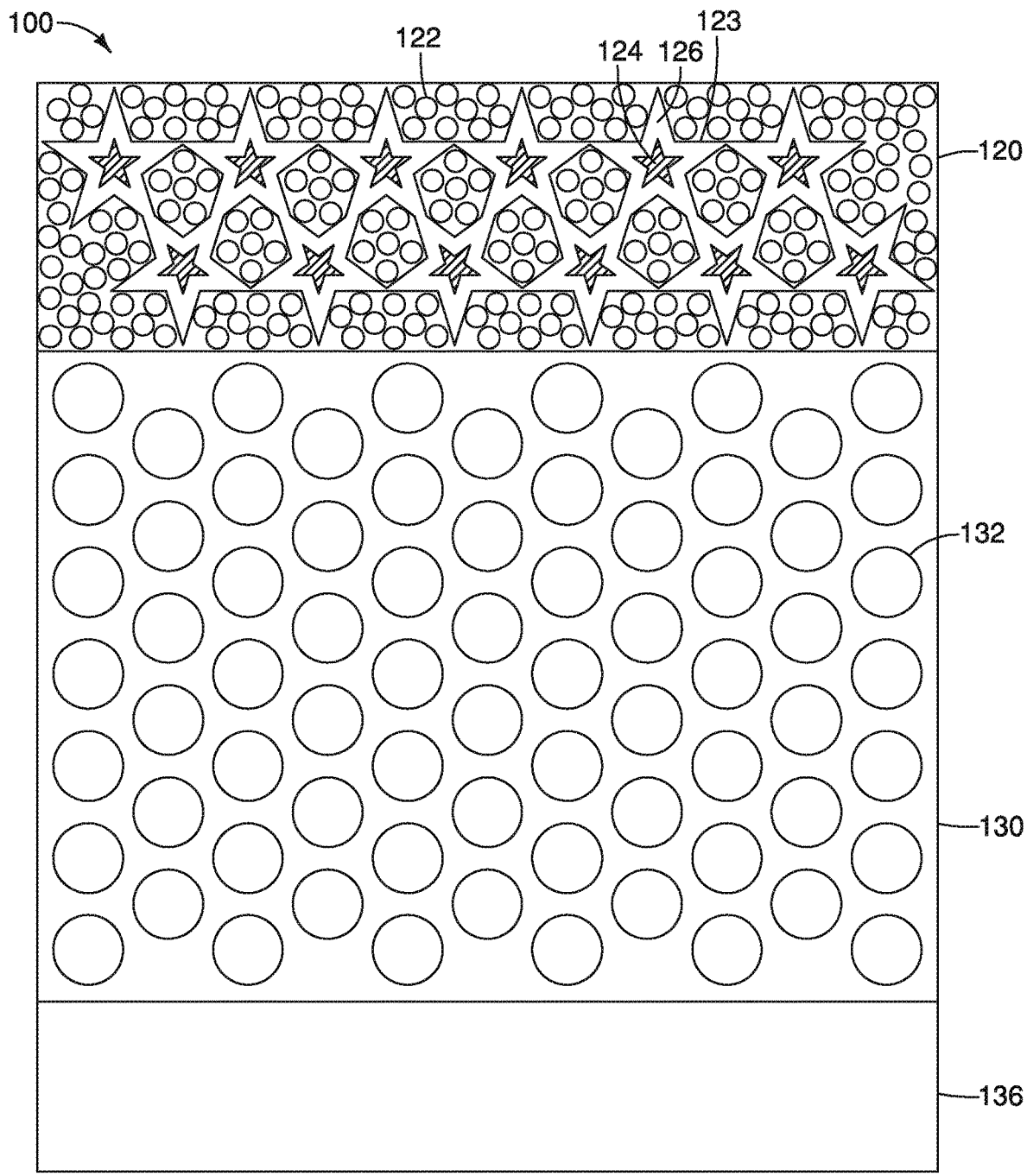
FIG. 6 is a cross sectional view of a solid state battery according to an embodiment.

FIG. 6 shows a solid-state battery 100 including a cathode 120 in accordance with a sixth embodiment. Like the solid-state battery of the first, second, third, fourth and fifth embodiments, the solid-state battery 100 is preferably an all-solid-state battery and can be incorporated in a vehicle, a mobile device, a laptop computer or other suitable personal electronic devices.

As shown in FIG. 6, the cathode 100 includes catholyte particles 122 and cathode active material particles 123. The cathode 100 may also optionally contain a binder (not shown). The binder may be any suitable electrode binder material. For example, the binder may include polytetrafluoroethylene, polyvinylidene fluoride, styrene-butadiene rubber, a cellulose material or any combination thereof. The binder is preferably polytetrafluoroethylene. The cathode 100 has a thickness of approximately 10 μm to 150 μm.

The catholyte particles 122 are formed of any suitable catholyte material for a solid-state battery. For example, the catholyte material may be any suitable lithium-ion conductive solid electrolyte material. For example, the solid electrolyte material can be a sulfide-based solid electrolyte, such as $Li_6PS_5Cl$, an oxide solid electrolyte, or a hybrid solid electrolyte that includes a sulfide-based solid electrolyte and a polyethylene oxide ("PEO") based polymer. The catholyte particles 122 have a size of approximately 100 nm to 5 μm.

The cathode active material particles 123 each include an electrically conductive core 124 covered by a cathode active material 126. The cathode active material particles 123 have a largest width of approximately 15 nm to 5 μm.

The electrically conductive core 123 is formed of any suitable electrically conductive material. For example, the electrically conductive core 123 can be formed of a carbon material or a conductive polymer, for example, a polymer that includes aromatic cycles, such as a polyfluorene or a polyphenylene, a polymer that includes double bonds such as a poly(acetylene), or a combination of both, such as PPV. The electrically conductive core 124 is preferably formed of a carbon material, such as graphene, carbon nanofibers (or micro fibers), bucky ball, graphene with holes, carbon nanotubes (single and multi-wall), and spongy carbon.

In FIG. 6, the electrically conductive core 124 has a shape of a three-dimensional star for each of the cathode active material particles 123. However, it should be understood that the electrically conductive core 124 may have any suitable shape. For example, the electrically conductive core 124 can also have a shape of a sphere, a cylinder, a shape having three-dimensional needle projections, a fiber shape, a sponge, a hexagonal prism, a hexagonal prismatic honeycomb sphere, or an irregular shape. As shown in FIG. 6, each of the cathode active material particles 123 has an electrically conductive core 124 with a same shape. However, it should be understood that the cathode active material particles 123 may have different shapes for the electrically conductive core 124. The electrically conductive core 124 has a largest width of approximately 100 nm to 6 μm.

The cathode active material 126 is provided on the surface of the electrically conductive core 124. As shown in FIG. 6, the cathode active material 126 completely coats or surrounds the electrically conductive core 124 of the cathode active material particles 123. Furthermore, in this embodiment, the cathode active material 126 is formed around the electrically conductive core 124 in the shape of a three-dimensional star for each of the cathode active material particles 123. However, it should be understood that the electrically conductive core 124 may have any suitable shape as long as the cathode active material particles 123 can be in contact with each other because the cathode active material 126 of each of the cathode active material particles 123 is in contact with the cathode active material 126 of another one of the cathode active material particles 123. For example, the electrically conductive core 124 can also have a shape of a shape having three-dimensional needle projections, a fiber shape, a hexagonal prism, or an irregular shape. As shown in FIG. 6, each of the cathode active material particles 123 has an electrically conductive core 124 with a same shape. However, it should be understood that the cathode active material particles 123 may have different shapes for the electrically conductive core 124.

The cathode active material 126 is any suitable cathode active material that is compatible with a solid electrolyte. For example, the cathode active material 126 can be a lithium transition metal oxide, a lithium olivine-type material, a sulfur material, or a mixture thereof. The lithium transition metal oxide can be NMC, lithium nickel cobalt aluminum oxide, lithium manganese oxide, lithium nickel manganese oxide, lithium nickel oxide, lithium cobalt oxide, or lithium nickel cobalt oxide. The lithium olivine-type material can be lithium phosphate, lithium iron phosphate, or a mixture thereof. The sulfur material has an extremely low electronic conductivity and can be sulfur, $Li_2S$, or a mixture thereof.

The cathode 120 includes at least 80 percent by weight of the cathode active material particles 123. The cathode 120 also includes at least fifteen percent by weight of the catholyte particles 122. The cathode 120 may include up to three percent by weight of the binder.

The electrically conductive core 124 of the cathode active material particles 123 can constitute as much as ten percent by weight of the cathode 120. In this embodiment, the cathode 120 does not include any electrically conductive additive provided external to the cathode active material particles 123. However, it should be understood that an electrically conductive additive may be provided external to the cathode active material particles 123, as long as the amount of the electrically conductive additive is less than or equal to one percent by weight relative to a total weight of the cathode 120. As such, the internal impedance and capacity retention of the cathode 120 can be enhanced, and cracking of the cathode active material particles 123 can beneficially be reduced.

As shown in FIG. 6, the solid-state battery 100 also includes an electrolyte 130. The electrolyte 130 is formed of solid electrolyte particles 132. The solid electrolyte particles 132 are formed of any suitable lithium-ion conductive solid electrolyte for a solid-state battery. For example, the lithium-ion conductive solid electrolyte can be a sulfide-based solid electrolyte, such as $Li_6PS_5Cl$, an oxide solid electrolyte, or a hybrid solid electrolyte that includes a sulfide-based solid electrolyte and PEO based polymer. For example, the solid electrolyte particles 132 are formed of the same material as the catholyte particles 3. However, the catholyte particles 123 preferably have a smaller particle size than the solid electrolyte particles 132. The electrolyte 130 has a thickness of approximately 20 µm to 600 µm.

The solid-state battery 100 further includes an anode 136. The anode 136 is formed of an anode active material. The anode 136 may also optionally include a binder and an additive. The anode active material is any suitable anode active material that is compatible with a solid electrolyte. For example, the anode active material is formed of metal, preferably entirely of metal. The anode active material is preferably formed of lithium, sodium, magnesium, or a mixture thereof. For example, the anode active material may be lithium or a lithium alloy. The anode active material may also be a silicon-based anode active material. The anode 136 includes approximately 90-95 percent by weight of the anode active material and five to ten percent by weight of any additive plus any binder. The anode 136 has a thickness of approximately 10 nm to 3 µm.

When a sulfide-based solid electrolyte is used as the electrolyte 130 and the anode 136 includes lithium metal, a protective layer (not shown) may be also provided between the electrolyte 130 and the anode 136.

Figure 7:
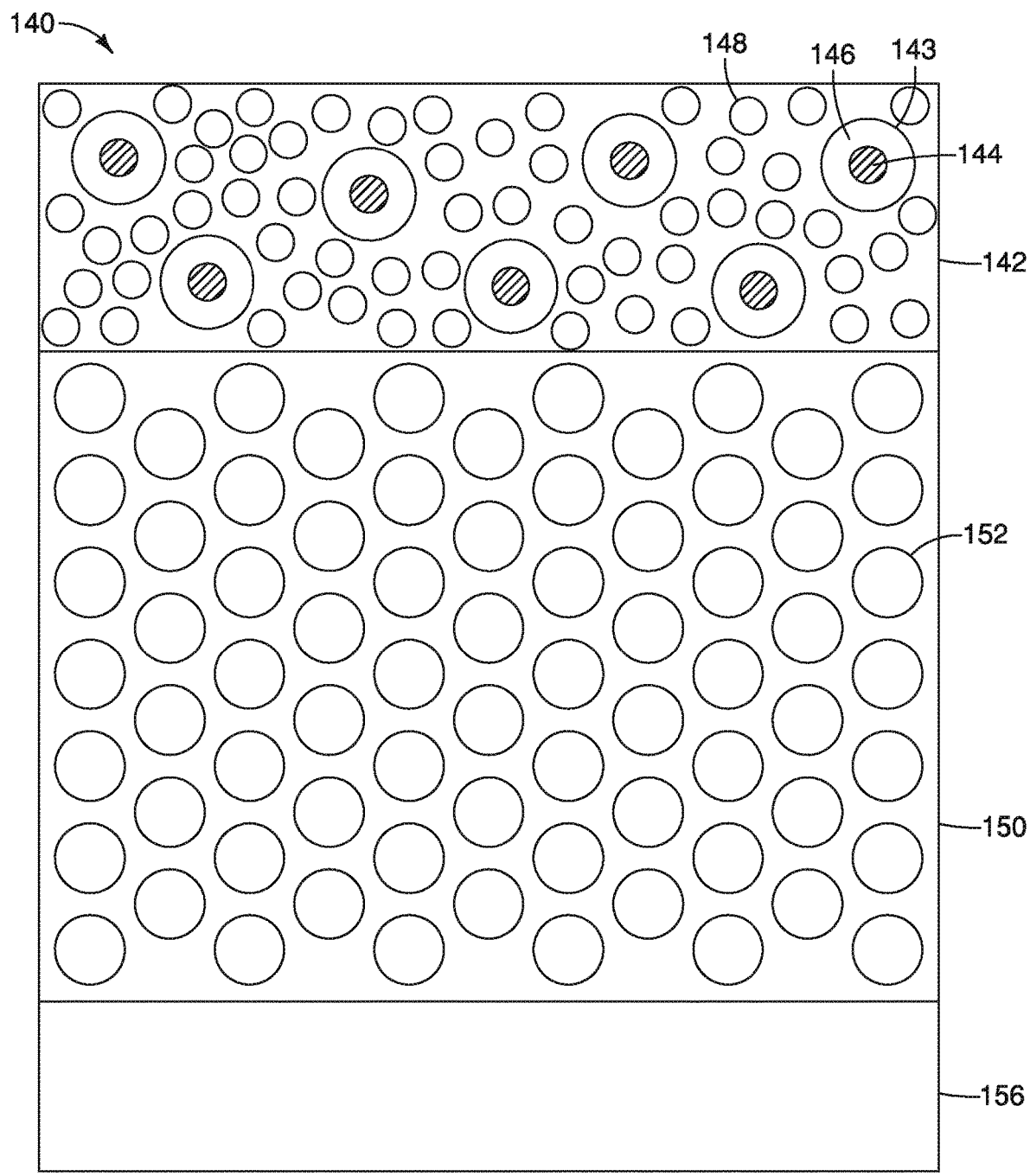
FIG. 7 is a cross sectional view of a solid state battery according to one embodiment.

FIG. 7 shows a solid-state battery 140 that includes a cathode 142 in accordance with a seventh embodiment. Like the solid-state battery of the first, second, third, fourth, fifth and sixth embodiments, the solid-state battery 140 is preferably an all-solid-state battery and can be incorporated in a vehicle, a mobile device, a laptop computer or other suitable personal electronic devices.

As shown in FIG. 7, the cathode 142 includes cathode active material particles 143. The cathode 142 may also optionally contain a binder (not shown). The binder may be any suitable electrode binder material. For example, the binder may include polytetrafluoroethylene, polyvinylidene fluoride, styrene-butadiene rubber, a cellulose material or any combination thereof. The binder is preferably polytetrafluoroethylene. The cathode 142 has a thickness of approximately 10 µm to 150 µm.

The cathode active material particles 143 include an electrically conductive core 144 and a cathode active material 146. The electrically conductive core 144 is formed of any suitable electrically conductive material. For example, the electrically conductive core 144 can be formed of a carbon material or a conductive polymer, for example, a polymer that includes aromatic cycles, such as a polyfluorene or a polyphenylene, a polymer that includes double bonds such as a poly(acetylene), or a combination of both, such as PPV. The electrically conductive core 144 is preferably formed of a carbon material, such as graphene, carbon nanofibers (or micro fibers), bucky ball, graphene with holes, carbon nanotubes (single and multi-wall), and spongy carbon. The cathode active material particles 143 have a diameter of approximately 3 µm to 15 µm.

In FIG. 7, the electrically conductive core 144 has a spherical shape for each of the cathode active material particles 143. However, it should be understood that the electrically conductive core 144 may have any suitable shape. For example, the electrically conductive core 144 can have a shape of a sphere, a three-dimensional star, a cylinder, a shape having three-dimensional needle projections, a fiber shape, a sponge, a hexagonal prism, a hexagonal prismatic honeycomb sphere, or an irregular shape. As shown in FIG. 7, each of the cathode active material particles 143 has an electrically conductive core 144 with a same shape. However, it should be understood that the cathode active material particles 143 may have different shapes for the electrically conductive core 144. The electrically conductive core 144 has a size of approximately 100 nm to 6 µm.

The cathode active material 146 is provided on the surface of the electrically conductive core 144. As shown in FIG. 7, the cathode active material 146 completely coats or surrounds the electrically conductive core 144 of the cathode active material particles 143. However, it should be understood that the cathode active material 146 may not completely cover the electrically conductive core 144.

The cathode active material 146 is any suitable cathode active material that is compatible with a solid electrolyte. For example, the cathode active material 146 may be a lithium transition metal oxide, a lithium olivine-type material, a sulfur material, or a mixture thereof. The lithium transition metal oxide can be NMC, lithium nickel cobalt aluminum oxide, lithium manganese oxide, lithium nickel manganese oxide, lithium nickel oxide, lithium cobalt oxide, or lithium nickel cobalt oxide. The lithium olivine-type material can be lithium phosphate, lithium iron phosphate, or a mixture thereof. The sulfur material has an extremely low electronic conductivity and can be sulfur, $Li_2S$, or a mixture thereof.

The cathode 142 also includes catholyte particles 148. Unlike the catholyte material in the other embodiments, the catholyte particles 148 are formed of a catholyte material that is both electronically and ionically conductive. For example, the electronically and ionically conductive catholyte material can be a blended radical polymer poly(4-glycidyloxy-2,2,6,6-tetramethylpiperidine-1-oxyl) ("PTEO") with poly(poly(ethylene oxide) methyl ether methacrylate) ("PPEGMA"), or a blended poly(3,4-ethylenedioxythiophene) polystyrene sulfonate ("PEDOT:PSS") with PEO.

The cathode 142 includes at least 80 percent by weight of the cathode active material particles 143. The cathode 142 also includes at least fifteen percent by weight of the catholyte particles 148. The cathode 142 may optionally include up to three percent by weight of the binder.

The electrically conductive core 144 of the cathode active material particles 143 can constitute as much as ten percent by weight of the cathode 140. However, in this embodiment, the cathode 142 does not include any electrically conductive additive provided external to the cathode active material particles 143. As such, the internal impedance and capacity retention of the cathode 142 can be enhanced, and cracking of the cathode active material particles 143 can beneficially be reduced.

As shown in FIG. 7, the solid-state battery 140 also includes an electrolyte 150. The electrolyte 150 is formed of solid electrolyte particles 152. As in the first, second, third, fourth, fifth and sixth embodiments, the solid electrolyte particles 152 are formed of any suitable lithium-ion conductive solid electrolyte for a solid-state battery. For example, the solid electrolyte can be a sulfide-based solid electrolyte, such as $Li_6PS_5Cl$, an oxide solid electrolyte, or a hybrid solid electrolyte that includes a sulfide-based solid electrolyte and a PEO based polymer. For example, the solid electrolyte particles 152 are formed of the same material as the catholyte particles 148. The electrolyte 150 has a thickness of approximately 20 μm to 600 μm.

The solid-state battery 140 further includes an anode 156 as shown in FIG. 7. The anode 156 is formed of an anode active material. The anode 156 may also optionally include a binder and an additive. The anode active material is any suitable anode active material that is compatible with a solid electrolyte. For example, the anode active material is formed of metal, preferably entirely of metal. The anode active material is preferably formed of lithium, sodium, magnesium, or a mixture thereof. For example, the anode active material may be lithium or a lithium alloy. The anode active material may also be a silicon-based anode active material. The anode 156 includes approximately 90-95 percent by weight of the anode active material and five to ten percent by weight of any additive plus any binder. The anode 156 has a thickness of approximately 10 nm to 3 μm.

When a sulfide-based solid electrolyte is used as the electrolyte 150 and the anode 156 includes lithium metal, a protective layer (not shown) may also be optionally provided between the electrolyte 150 and the anode 156.

FIGS. 1-7 all illustrate solid-state batteries. However, although not illustrated, it should be understood that the cathode active material particle designs of FIGS. 1-7 are all also applicable to liquid lithium-ion batteries.

Figure 8:
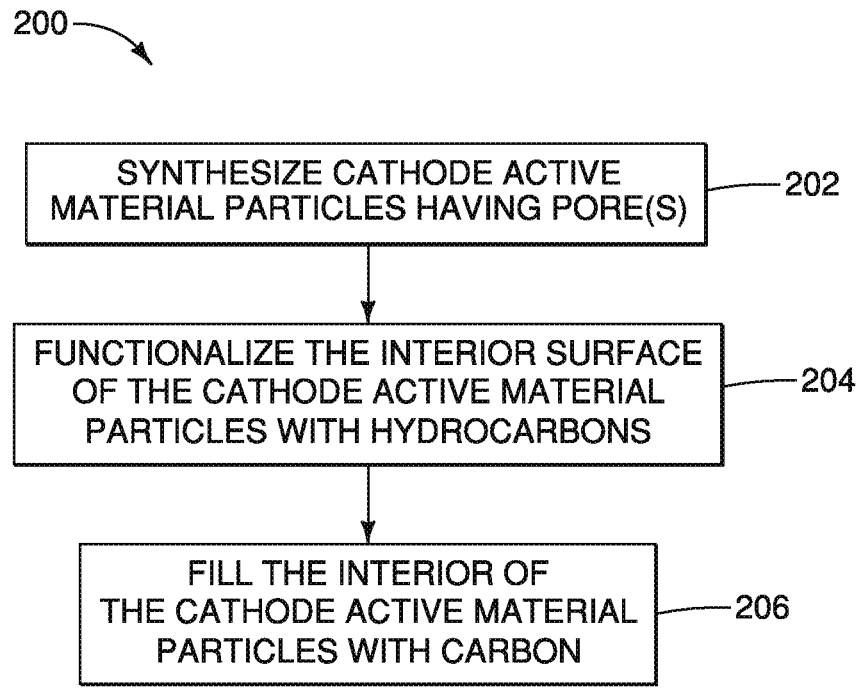
FIG. 8 is an illustrated flow chart showing a method of producing a cathode active material particles for a cathode having a reduced amount of carbon additive according to an embodiment.

FIG. 8 illustrates a process 200 of producing cathode active material particles having an electrically conductive core according to an eighth embodiment. The cathode active material particles may be used in a cathode of a solid state battery, for example an all-solid-state battery that can be incorporated in a vehicle, a mobile device, a laptop computer or other suitable personal electronic devices. The cathode active material particles may also be used in a cathode of a liquid lithium-ion battery.

In Step 202, cathode active material particles having pore(s) are synthesized. The cathode active material particles may be formed of any suitable cathode active material that is compatible with a solid electrolyte. For example, the cathode active material particles may be formed of a lithium transition metal oxide, a lithium olivine-type material, a sulfur material, or a mixture thereof. The lithium transition metal oxide can be NMC, lithium nickel cobalt aluminum oxide, lithium manganese oxide, lithium nickel manganese oxide, lithium nickel oxide, lithium cobalt oxide, or lithium nickel cobalt oxide. The lithium olivine-type material can be lithium phosphate, lithium iron phosphate, or a mixture thereof. The sulfur material has an extremely low electronic conductivity and can be sulfur, $Li_2S$, or a mixture thereof.

The cathode active material particles having a single pore or multiple pores may be synthesized by first treating cathode active material particles with a surfactant or another suitable templating agent sufficient to form a porous structure in the interior of the cathode active material particles. For example, the cathode active material particles may be treated with a cationic surfactant, such as cetyl trimethyl ammonium bromide ("CTAB"), an anionic surfactant, such as a fatty acid salt, a sulfated oil (ROSO4-M+), a higher fatty alcohol, a sulfonate surfactant (ROSO3-M+), and mixtures thereof, or a non-ionic surfactant, such as a polyglycerol alkyl ether, a glucosyl dialkyl ether, a crownether, an ester-linked surfactant, a polyoxyethylene alkyl ether, and mixtures thereof. Alternatively, the cathode active material particles may be treated with a templating agent such as an alkali metal ion like Na+ and soluble organic species such as quaternary amines, uncharged amines and alcohols.

The surfactant or templating agent may then be removed from the cathode active material particles to form pores or holes in the cathode active material particles. For example, the surfactant or templating agent is removed from the cathode active material particles by treating the cathode active material particles with a solvent that dissolves the surfactant or templating material but is inert to the cathode active material. It should be understood that the pores or holes may be formed in any suitable shape or pattern, as long as the pores or holes provide a space that can be filled with an electrically conductive material.

Alternatively, the cathode active material particles may be synthesized such that the pore(s) are formed therein when the cathode active material particles are formed. For example, monodisperse polystyrene sphere particles having a desired particle size may be used as templating seeds and cathode active material may be deposited on top of the polystyrene spheres. The polystyrene particles are then removed by calcination at 500° C. and the pore(s) are left in the cathode active material particles. In order to obtain a single pore in the cathode active material particles, we one polystyrene particle may be placed inside each cathode active material particle, and if multiple pores are desired, the cathode active material may be deposited on clusters of polystyrene particles.

In Step 204, the interior surface of the cathode active material particles is functionalized with hydrocarbons. This can be done in any suitable manner sufficient to functionalize the interior surface of the pores or holes in the cathode active material particles with hydrocarbons. The cathode active material particles may be functionalized with any suitable hydrocarbons that improve the bonding between the cathode active material particles and an electrically conductive material like carbon. Preferably, the cathode active material particles are treated with a reagent having an amine group (to bond to the interior walls of the cathode active material particles formed of a material such as NMC) and a hydrocarbon end to attract a carbon material. For example, the reagent may be ethylamine ($H_2N$—$CH_2$—$CH_3$), an amine terminated hydrocarbon group, such as ($NH_2CH_2CH_3$), or an alkyl-terminated poly(dimethylsiloxane) ("PDMS") such as methy-terminated PDMS or ethyl-terminated PDMS.

In Step 206, the pores or holes in the cathode active material particles are filled with carbon. However, it should be understood that the pores in the cathode active material particles may be filled with any suitable electrically conductive material. For example, the pores in the cathode active material particles can be filled with a carbon material or a conductive polymer, for example, a polymer that includes aromatic cycles, such as a polyfluorene or a polyphenylene, a polymer that includes double bonds such as a poly(acetylene), or a combination of both, such as PPV. The pores in the cathode active material particles are preferably filled with a carbon material, such as graphene, carbon nanofibers (or micro fibers), bucky ball, graphene with holes, carbon nanotubes (single and multi-wall), or spongy carbon.

Figure 9:
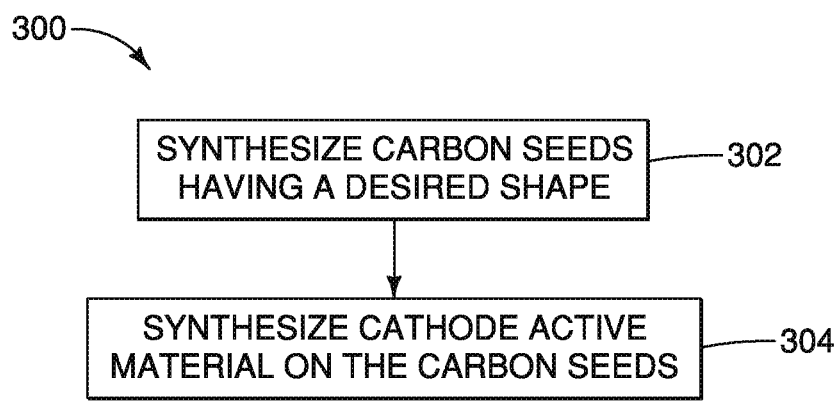
FIG. 9 is an illustrated flow chart showing a method of producing a cathode active material particles for a cathode having a reduced amount of carbon additive according to another embodiment.

FIG. 9 illustrates a process 300 of producing cathode active material particles having an electrically conductive core according to a ninth embodiment. The cathode active material particles may be used in a cathode of a solid state battery, for example an all-solid-state battery that can be incorporated in a vehicle, a mobile device, a laptop computer or other suitable personal electronic devices. The cathode active material particles may also be used in a cathode of a liquid lithium-ion battery.

In Step 302, carbon seeds are synthesized to have a desired shape. The carbon seeds may be formed of a carbon material such as graphene, carbon nanofibers (or micro fibers), bucky ball, graphene with holes, carbon nanotubes (single and multi-wall), or spongy carbon. The carbon seeds can be synthesized such that they form the shape of a sphere, a three-dimensional star, a cylinder, a shape having three-dimensional needle projections, a fiber shape, a sponge, a hexagonal prism, a hexagonal prismatic honeycomb sphere, or an irregular shape.

In Step 302, carbon seeds are used to form an electrically conductive core having a desired shape. However, it should be understood that seeds of any suitable electrically conductive material may be used to form the desired shape. For example, the electrically conductive material can alternatively be a conductive polymer, for example, a polymer that includes aromatic cycles, such as a polyfluorene or a polyphenylene, a polymer that includes double bonds such as a poly(acetylene), or a combination of both, such as PPV.

In Step 304, a cathode active material may be formed on the carbon seeds. For example, the cathode active material may be coated on the carbon seeds by any suitable coating technique, such as electrospinning, spray drying, freeze-drying, spark-plasma sintering, or other suitable coating techniques. Alternatively, the cathode active material may be formed on the carbon seeds by modifying a conventional cathode active material synthesis method in such a way that carbon is preserved during the synthesis.

The cathode active material can be any suitable cathode active material that is compatible with a solid electrolyte. For example, the cathode active material may be formed of a lithium transition metal oxide, a lithium olivine-type material, a sulfur material, or a mixture thereof. The lithium transition metal oxide can be NMC, lithium nickel cobalt aluminum oxide, lithium manganese oxide, lithium nickel manganese oxide, lithium nickel oxide, lithium cobalt oxide, or lithium nickel cobalt oxide. The lithium olivine-type material can be lithium phosphate, lithium iron phosphate, or a mixture thereof. The sulfur material has an extremely low electronic conductivity and can be sulfur, $Li_2S$, or a mixture thereof.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including," "having" and their derivatives. Also, the terms "part," "section," "portion," or "element" when used in the singular can have the dual meaning of a single part or a plurality of parts.

The terms of degree, such as "approximately" or "substantially" as used herein, mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:
1. A cathode comprising:
   a catholyte material including at least one of: a solid electrolyte material, a blended radical polymer poly(4-glycidyloxy-2,2,6,6-tetramethylpiperidine-1-oxyl) with poly(poly(ethylene oxide) methyl ether methacrylate), and a blended poly(3,4-ethylenedioxythiophene) polystyrene sulfonate with polyethylene oxide; and
   a plurality of cathode active material particles each comprising a core and a cathode active material disposed on a surface of the core, the core being formed of at least one selected from the group consisting of: a carbon material, a polymer that includes an aromatic cycle, and a polymer having at least one double bond, and the cathode active material including at least one selected from the group consisting of: a lithium transition metal oxide, a lithium olivine-type material, and a sulfur material.

2. The cathode according to claim 1, wherein
the core is formed of the carbon material.

3. The cathode according to claim 1, wherein
the cathode active material is disposed directly on the surface of the core for each of the plurality of cathode active material particles.

4. The cathode according to claim 1, further comprising
less than 1% by weight of a carbon additive relative to a total weight of the cathode, the carbon additive being provided external to each of the plurality of cathode active material particles.

5. The cathode according to claim 4, wherein
the core includes a functional group configured to bond to the cathode active material.

6. The cathode according to claim 1, wherein
the core has a shape selected from the group consisting of: a sphere, a three-dimensional star, a cylinder, a shape having three-dimensional needle projections, a fiber shape, a sponge, a hexagonal prism, a hexagonal prismatic honeycomb sphere, an irregular shape, and combinations thereof.

7. A battery comprising:
a cathode;
an anode; and
an electrolyte disposed between the cathode and the anode, the electrolyte including a first solid state electrolyte material,
the cathode comprising:
    a catholyte material including at least one of: a second solid electrolyte material, a blended radical polymer poly(4-glycidyloxy-2.2.6.6-tetramethylpiperidine-1-oxyl) with poly(poly(ethylene oxide) methyl ether methacrylate), and a blended poly(3,4-ethylenedioxythiophene) polystyrene sulfonate with polyethylene oxide; and
    a plurality of cathode active material particles each comprising a core and a cathode active material disposed on a surface of the core,
the core being formed of at least one selected from the group consisting of: a carbon material, a polymer that includes an aromatic cycle, and a polymer having at least one double bond, and
the cathode active material including at least one selected from the group consisting of: a lithium transition metal oxide, a lithium olivine-type material, and a sulfur material.

8. The battery according to claim 7, wherein
the catholyte material is formed of the second solid state electrolyte material, and the catholyte material has a smaller particle size than the first solid state electrolyte material.

9. The battery according to claim 7, wherein
the core is formed of the carbon material.

10. The battery according to claim 7, wherein
the cathode active material is disposed directly on the surface of the core for each of the plurality of cathode active material particles.

11. The battery according to claim 10, wherein
the catholyte material is provided on a surface of each of the plurality of cathode active material particles.

12. The battery according to claim 7, wherein the cathode further comprises
less than 1% by weight of a carbon additive relative to a total weight of the cathode, the carbon additive being provided external to each of the plurality of cathode active material particles.

13. The battery according to claim 12, wherein
the cathode does not include any of the carbon additive.

14. A battery comprising:
a cathode;
an anode; and
an electrolyte disposed between the cathode and the anode, the electrolyte including a first solid state electrolyte material,
the cathode including a plurality of cathode active material particles each comprising:
    a catholyte material core formed of at least one of: a second solid electrolyte material, a blended radical polymer poly(4-glycidyloxy-2.2.6.6-tetramethylpiperidine-1-oxyl) with poly(poly(ethylene oxide) methyl ether methacrylate), and a blended poly(3,4-ethylenedioxythiophene) polystyrene sulfonate with polyethylene oxide; and
    a cathode active material disposed on a surface of the catholyte material core, the cathode active material including at least one selected from the group consisting of: a lithium transition metal oxide. a lithium olivine-type material, and a sulfur material.

15. The battery according to claim 14, wherein
each of the plurality of cathode active material particles further comprises a material coated on a surface of the cathode active material, the material including at least one selected from the group consisting of: a carbon material, a polymer that includes an aromatic cycle, and a polymer having at least one double bond.

16. The battery according to claim 15, further comprising
a separator disposed between the cathode and the electrolyte, wherein:
the catholyte material core is formed of the second solid state electrolyte material and the second solid state electrolyte material is a same material as the first solid state electrolyte material.

17. The battery according to claim 14, wherein
the cathode active material does not completely cover the surface of the catholyte material core for each of the plurality of cathode active material particles.

* * * * *